US012752493B2

(12) United States Patent
Arifuku et al.

(10) Patent No.: US 12,752,493 B2
(45) Date of Patent: Oct. 6, 2026

(54) FORMING METHOD OF WATER-SOLUBLE PROTECTIVE FILM, AND PROCESSING METHOD OF PLATE-SHAPED OBJECT

(71) Applicant: DISCO CORPORATION, Tokyo (JP)

(72) Inventors: Norihisa Arifuku, Tokyo (JP); Koshiro Suzuki, Tokyo (JP); Yukihiro Kiribayashi, Tokyo (JP); Masamitsu Kimura, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 266 days.

(21) Appl. No.: 18/672,241

(22) Filed: May 23, 2024

(65) Prior Publication Data

US 2024/0424743 A1 Dec. 26, 2024

(30) Foreign Application Priority Data

Jun. 23, 2023 (JP) ................................ 2023-103052

(51) Int. Cl.
*B29C 65/16* (2006.01)
*B29C 71/00* (2006.01)
*B29L 7/00* (2006.01)

(52) U.S. Cl.
CPC ...... *B29C 65/1677* (2013.01); *B29C 71/0009* (2013.01); *B29K 2995/0062* (2013.01); *B29L 2007/002* (2013.01)

(58) Field of Classification Search
CPC . B29C 65/1677; B29C 65/18; B29C 71/0009; B29C 66/472; B29C 66/73792; B29C 66/7392; B29K 2995/0062
USPC ...................................................... 156/272.8
See application file for complete search history.

(56) References Cited

U.S. PATENT DOCUMENTS

2009/0258187 A1* 10/2009 Brady .................... C03C 17/32 428/156
2010/0080989 A1* 4/2010 Asai ................... H10P 72/7402 156/272.8

FOREIGN PATENT DOCUMENTS

JP 10305420 A 11/1998
JP 2006140311 A 6/2006

* cited by examiner

*Primary Examiner* — James D Sells
(74) *Attorney, Agent, or Firm* — Greer, Burns & Crain, Ltd

(57) ABSTRACT

A forming method of a water-soluble protective film on a front surface of a plate-shaped object includes a water-soluble sheet arrangement step of arranging a water-soluble resin sheet having thermoplasticity on a side of the front surface of the plate-shaped object, and an integration step of heating the water-soluble resin sheet to melt or soften the same, and integrating the water-soluble resin sheet and the plate-shaped object, to form the water-soluble protective film on the plate-shaped object. Preferably, the water-soluble resin sheet may contain a light absorber. A processing method of a plate-shaped object includes the water-soluble sheet arrangement step and integration step.

10 Claims, 8 Drawing Sheets

FORMING METHOD OF WATER-SOLUBLE PROTECTIVE FILM, AND PROCESSING METHOD OF PLATE-SHAPED OBJECT

BACKGROUND OF THE INVENTION

Field of the Invention

The present invention relates to a forming method of a water-soluble protective film, which includes forming the water-soluble protective film on a front surface of a plate-shaped object, and also to a processing method of a plate-shaped object, which includes covering a front surface of a plate-shaped object with a water-soluble protective film, and then processing the plate-shaped object.

Description of the Related Art

When device chips to be used in electronic equipment such as cellular phones or computers are manufactured, a plate-shaped object (workpiece) such as a semiconductor wafer is first provided. Then, a plurality of intersecting scribe lines (streets) are set on a front surface of the plate-shaped object, devices are formed in individual regions defined by the scribe lines on the front surface of the plate-shaped object, and the plate-shaped object is divided along the scribe lines, whereby individual device chips are obtained. Known as a dividing method of the plate-shaped object is, for example, a method that irradiates the plate-shaped object with a laser beam along the scribe lines to subject the plate-shaped object to ablation processing (see, for example, Japanese Patent Laid-open No. Hei 10-305420). When ablation processing is performed, however, melt called "debris" scatters from the plate-shaped object, and the debris is stuck on the front surface of the plate-shaped object. Here, a problem arises that removal of the debris stuck on the plate-shaped object is not easy, and the debris reduces the quality of device chips to be manufactured eventually.

A water-soluble protective film is therefore formed on the front surface of the plate-shaped object before the plate-shaped object is subjected to ablation processing (see, Japanese Patent Laid-open No. 2006-140311). In this case, when the plate-shaped object is irradiated through the protective film with a laser beam and is subjected to ablation processing, scattered debris is stuck on the protective film. When the plate-shaped object is subsequently rinsed, the debris is easily removed along with the protective film. The formation of the water-soluble protective film on the plate-shaped object is performed by a method that supplies a liquid resin, as a raw material for the protective film, onto the front surface of the plate-shaped object with a spinner table, on which the plate-shaped object is held, kept rotating at a high speed, spreads the liquid resin over the front surface of the plate-shaped object under a centrifugal force, and dries and solidifies the liquid resin. In short, the protective film is formed on the plate-shaped object by spin coating.

SUMMARY OF THE INVENTION

Here, on the front surface of a plate-shaped object, a variety of structural members may be formed, and projecting structural members called "bumps" may also be formed. If the front surface of a plate-shaped object has projections and recesses as mentioned above and a protective film is formed by spin coating on the front surface of the plate-shaped object, the protective film is thinner at the projections on the front surface of the plate-shaped object, so that the protective film cannot be formed with a sufficient thickness there. It may then be contemplated to form a thick protective film as a whole. In this case, however, the raw material for the protective film is consumed in a large amount, leading to inefficiency in economy, and moreover, the protective film becomes extremely thick at the recesses in the front surface of the plate-shaped object. To fully perform ablation processing through thick portions of the protective film, irradiation conditions for a laser beam have to be raised. However, this leads to a reduction in the processing efficiency of the plate-shaped object, and hence raises another problem.

The present invention therefore has, as an object thereof, the provision of a forming method of a water-soluble protective film and a processing method of a plate-shaped object, which form the water-soluble protective film with a uniform thickness on a front surface of a plate-shaped object irrespective of the conditions of the front surface of the plate-shaped object.

In accordance with a first aspect of the present invention, there is provided a forming method of a water-soluble protective film on a front surface of a plate-shaped object. The forming method includes a water-soluble sheet arrangement step of arranging a water-soluble resin sheet having thermoplasticity on a side of the front surface of the plate-shaped object, and an integration step of heating the water-soluble resin sheet to melt or soften the same, and integrating the water-soluble resin sheet and the plate-shaped object, to form the water-soluble protective film on the plate-shaped object.

Preferably, the water-soluble resin sheet contains a light absorber.

In accordance with a second aspect of the present invention, there is provided a processing method of a plate-shaped object. The processing method includes a water-soluble sheet arrangement step of arranging a water-soluble resin sheet having thermoplasticity on a side of a front surface of the plate-shaped object, an integration step of heating the water-soluble resin sheet to melt or soften the same, and integrating the water-soluble resin sheet and the plate-shaped object, to form a water-soluble protective film on the plate-shaped object, a processing step of, after performing the integration step, processing the plate-shaped object, and a water-soluble protective film removal step of, after performing the processing step, supplying a rinse solution to the plate-shaped object, and removing the water-soluble protective film from the plate-shaped object.

Preferably, in the processing step, the plate-shaped object is irradiated via the water-soluble protective film with a laser beam of a wavelength having absorptivity for the plate-shaped object, to process the plate-shaped object.

Also preferably, in the processing step, the water-soluble protective film is removed in parts to have the plate-shaped object exposed through removed portions of the water-soluble protective film, and portions of the plate-shaped object exposed through the water-soluble film are processed.

Also preferably, the water-soluble resin sheet contains a light absorber.

In the forming method according to the first aspect of the present invention and the processing method according to the second aspect of the present invention, the water-soluble resin sheet having thermoplasticity is arranged on the side of the front surface of the plate-shaped object, the water-soluble resin sheet is heated, and is melted or softened, and the water-soluble resin sheet and the plate-shaped object are integrated. As a consequence, the water-soluble protective film is formed on the plate-shaped object. In these methods, the thickness of the water-soluble protective film does not change depending on the location even if the plate-shaped object has projections and recesses in the front surface of the plate-shaped object. In other words, the water-soluble protective film can sufficiently protect the projections on the front surface of the plate-shaped object, and in addition does not become excessively thick at the recesses. Accordingly, the raw material for the water-soluble protective film is not used more than necessary, and there is no need to perform the processing on the plate-shaped object with a higher intensity than necessary.

According to the first and second aspects of the present invention, there are provided a forming method of a protective film and a processing method of a plate-shaped object, which can form a water-soluble protective film of a uniform thickness on a front surface of a plate-shaped object irrespective of the conditions of the front surface of the plate-shaped object.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
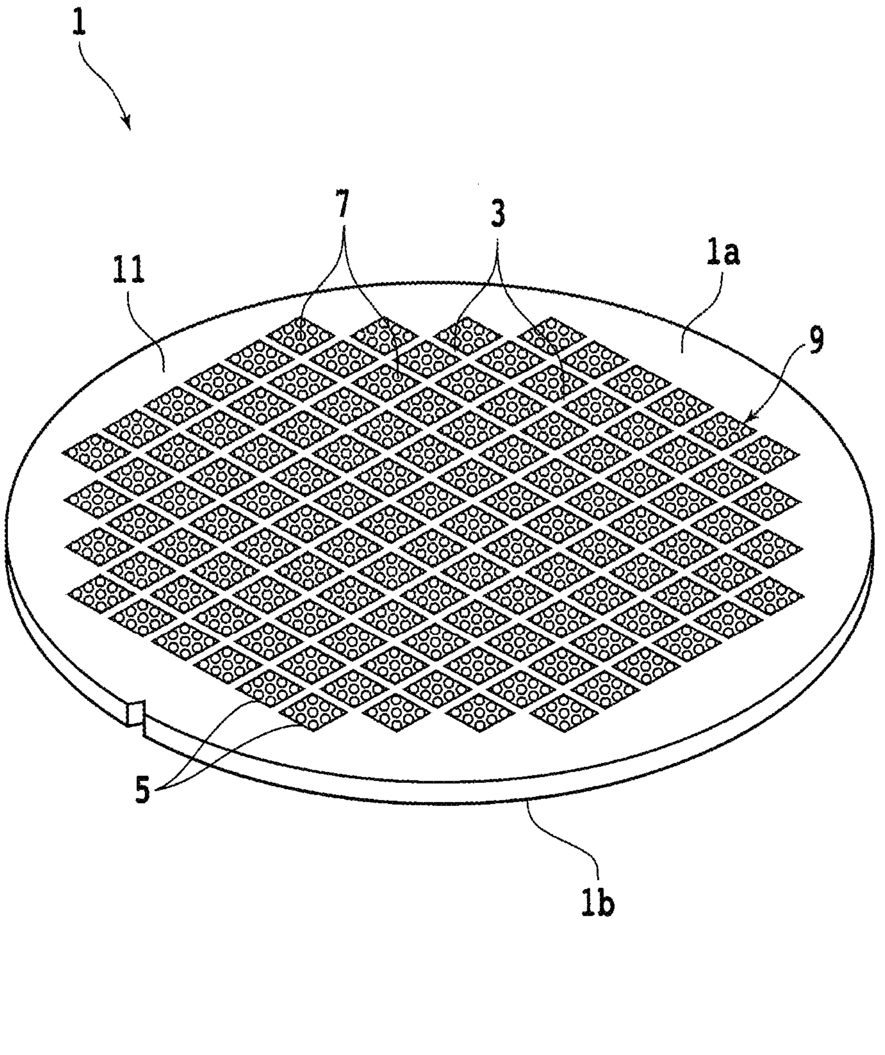
FIG. 1 is a perspective view schematically depicting a plate-shaped object, to which a forming method and processing method according to an embodiment of the first and second aspects of the present invention can be applied.

With reference to FIGS. 1 to 3B, 5, 6, and 8 of the attached drawings, a description will be made about an embodiment of the first and second aspects of the present invention. In the forming method according to the embodiment of a water-soluble protective film and the processing method according to the embodiment of a plate-shaped object, the water-soluble protective film is formed on a front surface of the plate-shaped object (workpiece) such as a semiconductor wafer with a plurality of devices formed on a front surface thereof. A description will first be made about the plate-shaped object on the front surface of which the water-soluble protective film is to be formed. FIG. 1 is a perspective view schematically depicting a plate-shaped object 1. The plate-shaped object 1 is a wafer formed from a material such as, for example, silicon (Si), silicon carbide (Sic), gallium nitride (GaN), gallium arsenide (GaAs), or a further semiconductor. As an alternative, the plate-shaped object 1 is a substantially disk-shaped substrate or the like made from a material such as sapphire, glass, or quartz. The glass is, for example, alkali glass, alkali-free glass, soda-lime glass, lead glass, borosilicate glass, quartz glass, or the like.

Figure 2A:
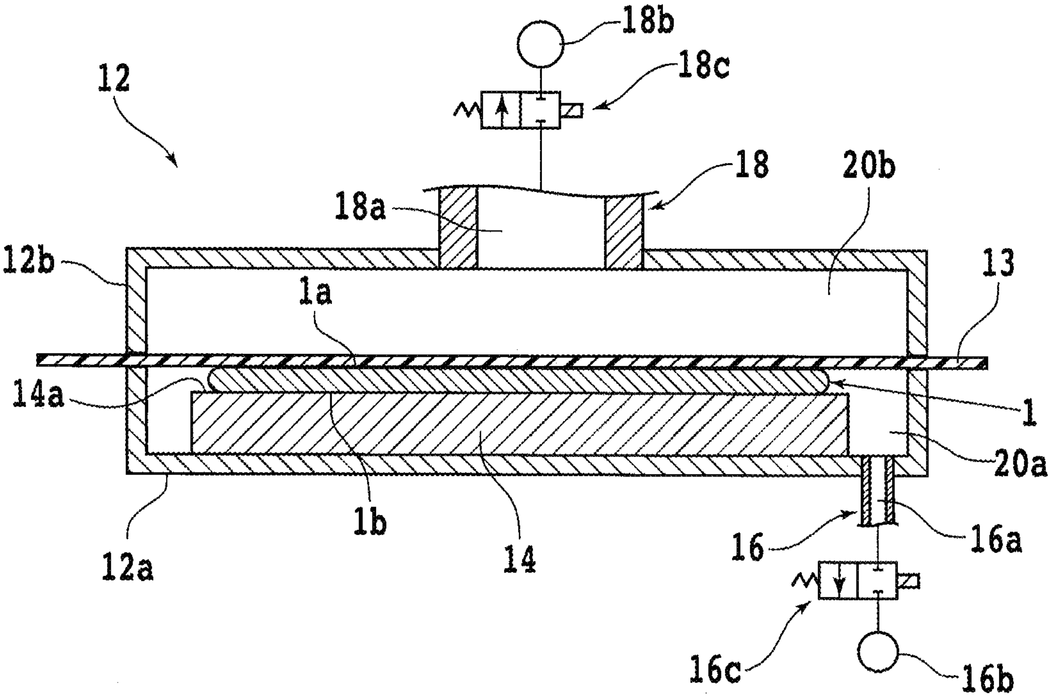
FIG. 2A is a cross-sectional view schematically depicting a fixing apparatus in a water-soluble resin sheet arrangement step of the forming method and processing method of the embodiment.
Figure 2B:
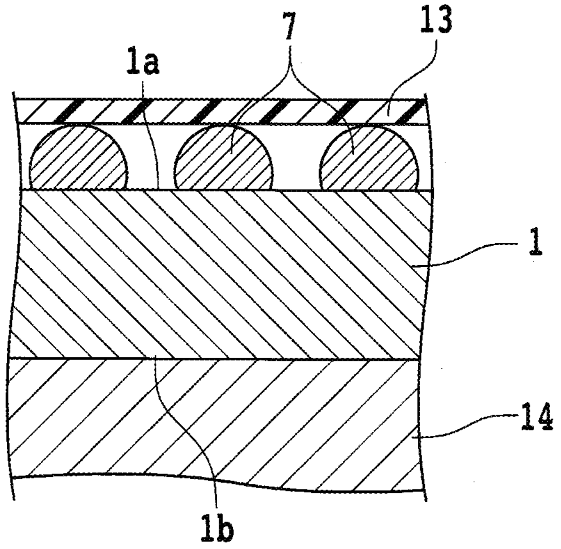
FIG. 2B is a fragmentary cross-sectional view schematically depicting, on an enlarged scale, the plate-shaped object of FIG. 1 on a front surface of which a water-soluble resin sheet has been arranged.

In FIG. 1, the perspective view of the plate-shaped object 1 is schematically depicted. A cross-sectional view of the plate-shaped object 1 is schematically depicted in FIG. 2A, and an enlarged fragmentary cross-sectional view of the plate-shaped object 1 is schematically depicted in FIG. 2B. On a front surface 1*a* of the plate-shaped object 1, a plurality of intersecting scribe lines 3 are set. In the individual regions defined by the scribe lines 3, devices 5 such as integrated circuits (ICs) or large-scale integrations (LSIs) are formed. By grinding the plate-shaped object 1 from a side of a back surface 1*b* thereof, and then dividing it along the scribe lines 3, individual device chips can be formed. On the front surface 1*a* of the plate-shaped object 1, a plurality of projections formed from a metal material and called "bumps" 7 are disposed. The bumps 7 are electrically connected to the respective devices 5, and after division of the plate-shaped object 1 and formation of the device chips, function as electrodes when electrical signals are inputted to or outputted from the devices 5. The metal material is, for example, gold, silver, copper, aluminum, or the like. It is, however, not essential to dispose the bumps 7 on the front surface 1*a* of the plate-shaped object 1.

A region on the front surface 1*a* of the plate-shaped object 1, the region being located on a side of an outer periphery of the plate-shaped object 1 and surrounding a region where the devices 5 are formed, is called an "outer peripheral surplus region" 11. In the outer peripheral surplus region 11 on the front surface 1*a* of the plate-shaped object 1, the devices 5 are not formed, and the bumps 7 as the electrodes for the devices 5 are also not formed. The remaining region on the front surface 1*a* of the plate-shaped object 1, the region being surrounded by the outer peripheral surplus region 11, is called a "device forming region" 9. The device forming region 9 on the front surface 1*a* of the plate-shaped object 1 is not planar, and has projections and recesses formed by individual patterns, which constitute the devices 5, and bumps 7. In contrast, the outer peripheral surplus region 11 on the front surface 1*a* is planar.

It is to be noted that the plate-shaped object 1, on which a water-soluble protective film is to be formed, is not limited to the one mentioned above. The plate-shaped object 1 may be, for example, a package substrate formed by encapsulating a plurality of devices, which are arranged side by side on a plane, with an encapsulating resin. By dividing the package substrate for each device, individual device chips encapsulated with the encapsulating resin can be formed. Because bumps as electrodes for the individual devices are formed on a front surface of the package substrate, the front surface of the package substrate is not planer either, and also includes projections and recesses.

By dividing the plate-shaped object 1 along the scribe lines 3, the individual device chips are obtained. The division of the plate-shaped object 1 is performed, for example, by ablation processing that applies a laser beam, which is of a wavelength having absorptivity for the plate-shaped object 1, to the plate-shaped object 1 along the scribe lines 3. In the ablation processing, the plate-shaped object 1 is melted off along points of irradiation with the laser beam, so that dividing grooves are formed. When the plate-shaped object 1 is subjected to the ablation processing, melt called "debris" is scattered around, and is stuck on the front surface 1*a* of the plate-shaped object 1. It is difficult to completely remove the debris, which is stuck on the plate-shaped object 1, through a conventional rinsing step. At least a portion of the debris therefore remains on the device chips eventually formed by the division of the plate-shaped object 1, leading to a reduction in the quality of the device chips.

It is hence known to form a water-soluble protective film on the front surface 1*a* of the plate-shaped object 1 by supplying a water-soluble liquid resin onto the front surface 1*a* of the plate-shaped object 1, and drying the liquid resin (spin coating). With this method, however, the water-soluble protective film formed on the plate-shaped object 1 is not even in thickness if the projections and recesses on the side of the front surface 1*a* of the plate-shaped object 1 are large. For example, the water-soluble protective film is thin on the projections on the front surface 1*a* of the plate-shaped object 1, and is thick over the recesses. With the forming method and processing method according to this embodiment, however, a water-soluble protective film of a uniform thickness is formed on the front surface 1*a* of the plate-shaped object 1 irrespective of the profile of the front surface 1*a* of the plate-shaped object (workpiece) 1.

Figure 8:
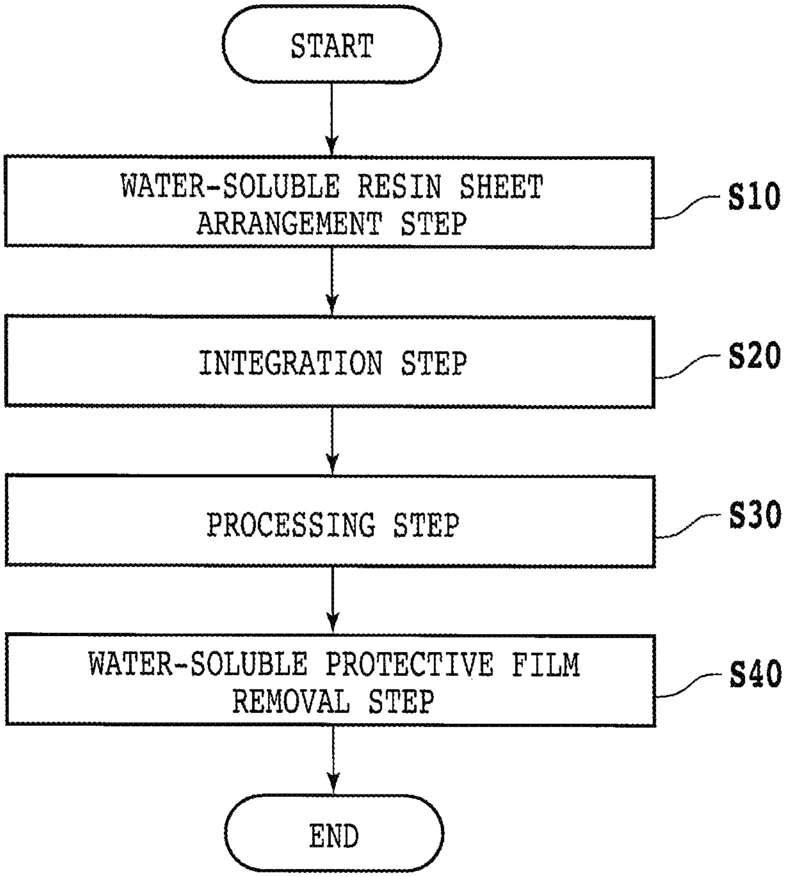
FIG. 8 is a flow chart illustrating a flow of the individual steps of the processing method according to the embodiment.

FIG. 8 is a flow chart illustrating a flow of the individual steps of the processing method according to this embodiment. The forming method of the water-soluble protective film is performed as some of the steps of the processing method of the plate-shaped object. A description will hereinafter be made about the processing method according to this embodiment of the plate-shaped object. Accordingly, this means that the following description also illustrates the forming method according to this embodiment of the water-soluble protective film. In the processing method according to this embodiment of the plate-shaped object, a water-soluble resin sheet arrangement step S10 and an integration step S20 are first performed. In the water-soluble resin sheet arrangement step S10, a water-soluble resin sheet 13 (see FIG. 2A) having thermoplasticity is arranged on the side of the front surface 1*a* of the plate-shaped object 1. In the integration step S20, the water-soluble resin sheet 13 is then heated, and hence melted or softened, followed by integration of the water-soluble resin sheet 13 and the plate-shaped object 1 to form a water-soluble protective film on the plate-shaped object 1 (see FIG. 2B).

Here, the water-soluble resin sheet 13 is a sheet having thermoplasticity and made from a water-soluble material such as, for example, polyvinyl alcohol (PVA), and is formed with a thickness of 10 μm or greater and 80 μm or smaller. The water-soluble resin sheet 13 does not includes a glue layer (adhesive material layer), and cannot be fixed on the plate-shaped object 1 if applied as it is.

It is to be noted that PVA for use in the water-soluble resin sheet 13 may contain units of another monomer. Illustrative of such a monomer are α-olefins such as ethylene, propylene, 1-butene, isobutene, and 1 hexene; acrylic acid, its salts, and acrylate esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid, its salts, and methacrylate esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, and acrylamide derivatives such as N-methyl acrylamide, N-ethyl acrylamide, N,N-dimethyl acrylamide, diacetone acrylamide, acrylamide propanesulfonate and its salts, acrylamide propyl dimethylamine and its salts, and N-methylol acrylamide and its derivatives; methacrylamide, and methacrylamide derivatives such as N-methyl methacrylamide, N-ethyl methacrylamide, methacrylamide propanesulfonate and its salts, methacrylamide propyl dimethylamine and its salts, and N-methylol methacrylamide and its derivatives; N-vinylamides such as N-vinylpyrrolidone, N-vinyl formamide, and N-vinyl acetamide; allyl ethers having polyalkylene oxide groups as side chains; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile, and methacrylonitrile; vinyl halides such as vinyl chloride, vinylidene chloride, vinyl fluoride, and vinylidene fluoride; allyl compounds such as allyl acetate and allyl chloride; maleic acid, and its salts and esters; vinylsilyl compounds such as vinyltrimethoxysilane; isopropenyl acetate; and so on.

Further, a plasticizer may also be added to the water-soluble resin sheet 13 to improve its followability to the projections and recesses in the front surface 1*a* of the plate-shaped object 1. As the plasticizer to be incorporated in the water-soluble resin sheet 13, no particular limitation is imposed insofar as it is generally used as a plasticizer for PVA. Examples include polyhydric alcohols such as glycerin, diglycerin, diethylene glycol, triethylene glycol, propylene glycol, dipropylene glycol, trimethylol propane, pentaerythritol, and 1,3-butanediol; polyethers such as polyethylene glycol and polypropylene glycol; polyvinylamides such as polyvinyl pyrrolidone; amide compounds such as N-methylpyrrolidone and dimethylacetamide; ethylene oxide adducts of polyhydric alcohols, such as glycerin, pentaerythritol, and sorbitol; water; and so on. These plasticizers can be used either singly or in combination. Among these plasticizers, use of one or more of glycerin, diglycerin, diethylene glycol, triethylene glycol, propylene glycol, dipropylene glycol, trimethylol propane, polyethylene glycol, and polyvinylpyrrolidone is preferred to improve the water solubility. Further, from the standpoint of effect for suppressing a reduction in the water solubility of the water-soluble resin sheet 13 due to bleed-out of the plasticizer, it is particularly preferred to use, as the plasticizer, one or more of glycerin, diglycerin, trimethylol propane, polyethylene glycol, and polyvinylpyrrolidone.

The water-soluble resin sheet 13 preferably contains a light absorber, which desirably has a light absorption coefficient of 1,000/cm or greater. For example, a benzophenone-based ultraviolet absorber is mixed in the water-soluble resin sheet 13. As the light absorber, titanium dioxide, cerium oxide, carbon black, zinc oxide, silicon powder, yellow iron oxide, sulfide pigments, nitroso pigments, nitro pigments, azo lake pigments, lake pigments, phthalocyanine pigments, threne pigments, quinacridone pigments, and the like may also be additionally used either singly or in combination. The light absorber preferably has a melting point of, for example, 50° C. or higher and 250° C. or lower, with 60° C. or higher and 220° C. or lower being more preferred, and 80° C. or higher and 200° C. or lower being still more preferred. If the melting point of the light absorber is lower than this range, the light absorber may be dissolved out of the water-soluble resin sheet 13 to stick the plate-shaped object 1 when the water-soluble resin sheet 13 is fixed on the plate-shaped object 1 as will be mentioned later. If the melting point of the light absorber is higher than this range, on the other hand, the light absorber may not be appropriately dispersed in the water-soluble resin sheet 13 when the water-soluble resin sheet 13 is formed.

A description will next be made about a fixing apparatus in which the water-soluble resin sheet arrangement step S10 and the integration step S20 are performed. FIG. 2A is a cross-sectional view schematically depicting an example of a fixing apparatus 12. The fixing apparatus 12 is, for example, a box-shaped unit having an internal space in which the plate-shaped object 1 can be held, and has a function to bring the water-soluble resin sheet 13 into close contact with the front surface 1*a* of the plate-shaped object 1.

The fixing apparatus 12 has an upwardly open, recessed lower body 12*a*, and a downwardly open, recessed upper body 12*b* arranged above the lower body 12*a*. The upper body 12*b* can be raised and lowered. The lower body 12*a* has an opening, which is of the same shape as an opening of the upper body 12*b*. When the upper body 12*b* is lowered to the lower body 12*a* so as to make their openings overlap each other, a space that is isolated from an outside is formed inside the upper body 12*b* and lower body 12*a*. It is to be noted that the openings are both greater than the plate-shaped object 1, and the plate-shaped object 1 can be held in the space accordingly.

The lower body 12*a* is provided with a plate-shaped object support portion 14, which has a table shape and supports the plate-shaped object 1. The plate-shaped object support portion 14 has an upper surface, which serves as a planar support surface 14*a* to support the plate-shaped object 1. The height of the plate-shaped object support portion 14 is adjusted such that, when the plate-shaped object 1 is placed on the support surface 14*a*, the front surface 1*a* of the plate-shaped object 1 and the opening of the lower body 12*a* lie at substantially the same height. As an alternative, the height of the plate-shaped object support portion 14 is adjusted such that the opening of the lower body 12*a* is located higher than the front surface 1*a* of the plate-shaped object 1. In these cases, the water-soluble resin sheet 13 is prevented from being brought into close contact with a side surface of the plate-shaped object 1 over an unnecessarily wide area when the water-soluble resin sheet 13 is placed on the lower body 12*a* and is then brought into close contact with the plate-shaped object 1 as will be mentioned later.

An exhaust unit 16 is connected to a bottom wall or side wall (the bottom wall in FIG. 2A) of the lower body 12*a*. The exhaust unit 16 has an exhaust path 16*a* connected at one end thereof to the lower body 12*a* and at the other end thereof to a suction source 16*b*. In the exhaust path 16*a*, a switching device 16*c* constituted by a solenoid valve or the like may be disposed, and the state of communication between the suction source 16*b* and the lower body 12*a* may be switched by the switching device 16*c*. Further, to a top wall or side wall (the top wall in FIG. 2A) of the upper body 12*b*, an exhaust unit 18 is connected. The exhaust unit 18 has an exhaust path 18*a* connected at one end thereof to the upper body 12*b* and at the other end thereof to a suction source 18*b*. In the exhaust path 18*a*, a switching device 18*c* constituted by a solenoid valve or the like may be disposed, and the state of communication between the suction source 18*b* and the upper body 12*b* may be switched.

In the water-soluble resin sheet arrangement step S10 that is performed in the fixing apparatus 12, the plate-shaped object 1 is loaded onto the plate-shaped object support portion 14, and after the plate-shaped object 1 is supported on the plate-shaped object support portion 14, the front surface 1*a* of the plate-shaped object 1 is covered by the water-soluble resin sheet 13. At a position adjacent the fixing apparatus 12, a resin film supply unit (not depicted) is disposed. In the resin film supply unit, the water-soluble resin sheet 13 is provided as a plurality of sheets, or in a roll form. The water-soluble resin sheet 13 that covers the plate-shaped object 1 is supplied from the resin film supply unit.

The water-soluble resin sheet 13 provided in the resin film supply unit is greater than the opening of the lower body 12*a* such that a closed space 20*a* can be formed by the lower body 12*a* and the water-soluble resin sheet 13 when the water-soluble resin sheet 13 is loaded onto the plate-shaped object 1. After the water-soluble resin sheet 13 has been transferred onto the plate-shaped object 1, the upper body 12*b* is lowered to bring the upper body 12*b* into contact with an upper surface of the water-soluble resin sheet 13. Then, a closed space 20*b* is formed by the upper body 12*b* and the water-soluble resin sheet 13. When the water-soluble resin sheet 13 is arranged on the front surface 1*a* of the plate-shaped object 1 as described above, the interior of the box-shaped fixing apparatus 12 is brought into a state that it is divided into the space 20*b* on the upper side and the space 20*a* on the lower side. FIG. 2B is a fragmentary cross-sectional view schematically depicting, on an enlarged scale, the plate-shaped object 1 on the front surface 1*a* of which the water-soluble resin sheet 13 has been arranged.

Figure 3A:
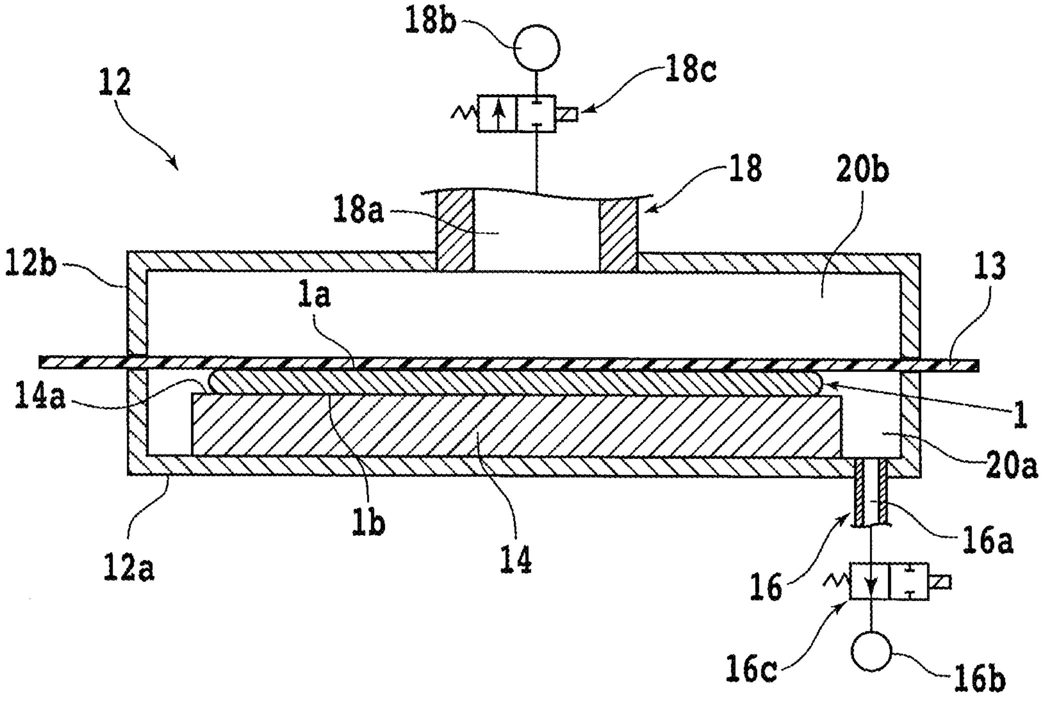
FIG. 3A is a cross-sectional view schematically depicting the fixing apparatus in an integration step of the forming method and processing method according to the embodiment.
Figure 3B:
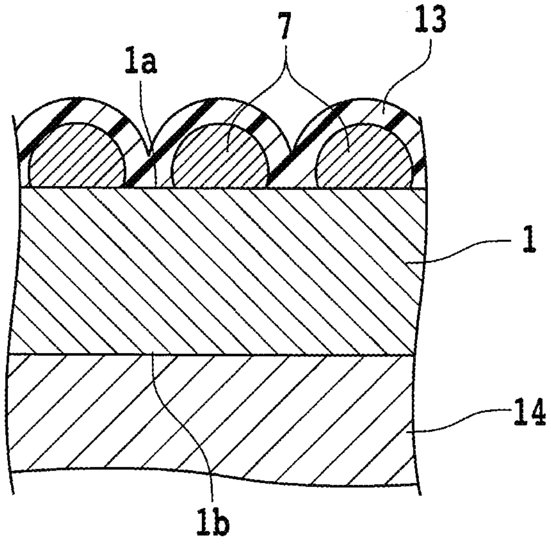
FIG. 3B is a fragmentary cross-sectional view schematically depicting, on an enlarged scale, the plate-shaped object of FIG. 1 on the front surface of which the water-soluble resin sheet has been fixed.

In the fixing apparatus 12, the integration step S20 is next performed to integrate the water-soluble resin sheet 13 and the plate-shaped object 1. In other words, the water-soluble resin sheet 13 is fixed on the plate-shaped object 1. FIG. 3A is a cross-sectional view schematically depicting the fixing apparatus 12 in the integration step S20. In the integration step S20 that is performed in the fixing apparatus 12, the switching device 16*c* is operated to bring the suction source 16*b* of the exhaust unit 16 into communication with the lower body 12*a* and, at the same time, the switching device 18*c* is operated to bring the suction source 18*b* of the exhaust unit 18 into communication with the upper body 12*b*. As a consequence, the space 20*a* and space 20*b* are each exhausted and depressurized. After that, the switching device 18*c* is operated such that only the suction source 18*b*, which is depressurizing the space 20*b*, is brought out of communication with the upper body 12*b*, and the space 20*b* is opened to the atmosphere. As a result, a significant differential pressure occurs in a moment between the space 20*a* and the space 20*b* with the water-soluble resin sheet 13 interposed therebetween. By this differential pressure, the water-soluble resin sheet 13 is brought into close contact with the front surface 1*a* of the plate-shaped object 1 such that the water-soluble resin sheet 13 follows the projections and recesses in the front surface 1*a*. FIG. 3B is a fragmentary cross-sectional view schematically depicting, on an enlarged scale, the plate-shaped object 1, with the front surface 1*a* of which the water-soluble resin sheet 13 is in close contact.

In the integration step S20, the water-soluble resin sheet 13 is now heated, and hence melted or softened, followed by integration of the water-soluble resin sheet 13 and the plate-shaped object 1. As a consequence, the water-soluble protective film is formed on the plate-shaped object 1. In the fixing apparatus 12, an undepicted heating member that can supply a heated gas may be connected to, for example, the top wall or side wall of the upper body 12*b*. This heating member has a function to supply the heated gas to the space 20*b* of the upper body 12*b*. This gas is, for example, air, nitrogen gas, or the like. As an alternative, the fixing apparatus 12 is provided with a heating member, which includes an electric heating wire or the like, inside the plate-shaped object support portion 14, which has the table shape and supports the plate-shaped object 1. This heating member has a function to heat the water-soluble resin sheet 13 via the plate-shaped object 1 by heating the plate-shaped object support portion 14.

The water-soluble resin sheet 13 has thermoplasticity, and its flexibility is improved when heated. When the heating member is operated to heat the water-soluble resin sheet 13, the water-soluble resin sheet 13 is melted or softened. As a consequence, the water-soluble resin sheet 13 is deformed following the profile of the front surface 1*a* of the plate-shaped object 1, whereby the water-soluble resin sheet 13 is brought into close contact with the front surface 1*a* of the plate-shaped object 1. The course that, under a pressure, the water-soluble resin sheet 13 is heated and brought into close contact with the plate-shaped object 1 as described above can also be called "thermocompression bonding." Before the depressurization of the space 20*a* and space 20*b*, the heated gas may be supplied by the heating member to the space 20*b* to heat and soften the water-soluble resin sheet 13 beforehand. As an alternative, after the space 20*a* and space 20*b* are depressurized and the space 20*b* is then opened to the atmosphere, the heating member may be operated to heat the water-soluble resin sheet 13 to promote the deformation of the water-soluble resin sheet 13.

Here, no particular limitation is imposed on the heating temperature for the water-soluble resin sheet 13, but the water-soluble resin sheet 13 may desirably be fixed on the plate-shaped object 1 by heating it to a temperature at which the water-soluble resin sheet 13 has a storage modulus of $10^5$ or higher and $10^7$ or lower. If the storage modulus of the water-soluble resin sheet 13 exceeds $10^7$, the water-soluble resin sheet 13 may not fully follow the projections and recesses in the front surface 1*a* of the plate-shaped object 1, and a gap may be formed between the water-soluble resin sheet 13 and the plate-shaped object 1. If the storage modulus of the water-soluble resin sheet 13 is smaller than $10^5$, on the other hand, the water-soluble resin sheet 13 cannot retain its form, and may flow on the front surface 1*a* of the plate-shaped object 1. If the water-soluble resin sheet 13 flows on the front surface 1*a* of the plate-shaped object 1, the water-soluble protective film is not formed with a uniform thickness on the front surface 1*a* of the plate-shaped object 1.

Subsequently, the heating of the water-soluble resin sheet 13 is stopped, and the temperature of the water-soluble resin sheet 13 is allowed to return to room temperature. Then, the water-soluble resin sheet 13 is fixed on the front surface 1*a* of the plate-shaped object 1. If the fixing apparatus 12 is used as described above, the water-soluble resin sheet 13 can be fixed (thermocompression-bonded) on the front surface 1*a* of the plate-shaped object 1. After the water-soluble resin sheet 13 has been fixed on the plate-shaped object 1, the exhaust unit 16 is stopped, and the upper body 12*b* is raised. The plate-shaped object 1 with the water-soluble resin sheet 13 fixed thereon is then unloaded. Subsequently, the water-soluble resin sheet 13 is cut along the outer periphery of the plate-shaped object 1, whereby the plate-shaped object 1 with the water-soluble protective film arranged on the front surface 1*a* is obtained. Reflecting the form of the water-soluble resin sheet 13, the water-soluble protective film formed on the plate-shaped object 1 in this manner has a uniform thickness.

Figure 4:
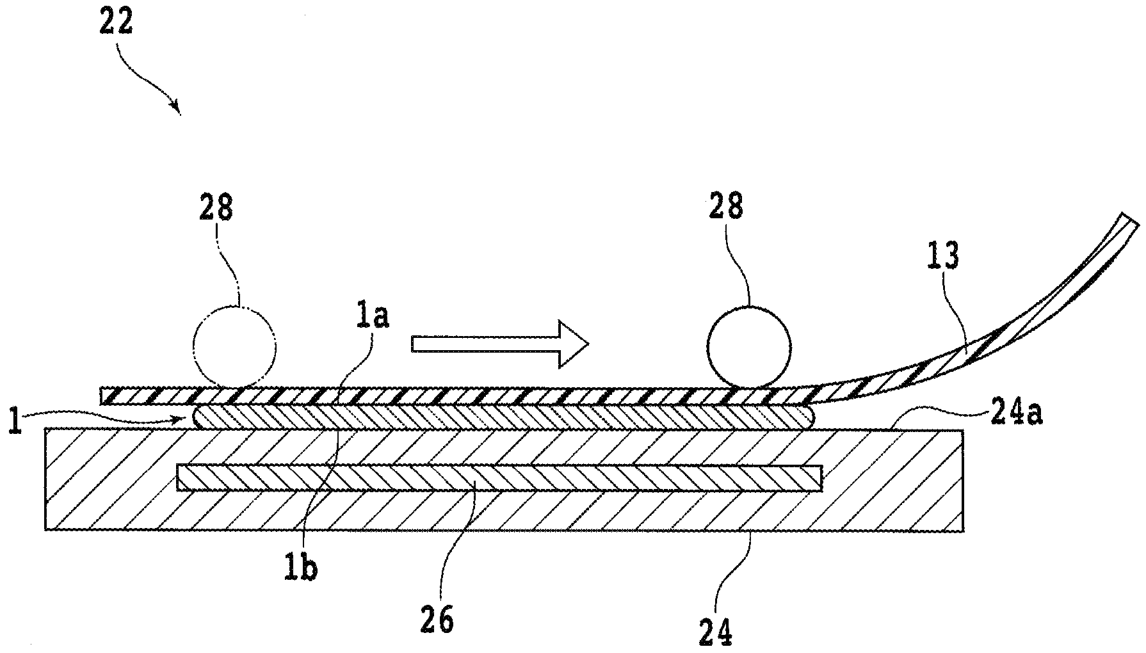
FIG. 4 is a cross-sectional view schematically depicting a plate-shaped object in an integration step according to a modification of the forming method and processing method of the embodiment.

In the processing method according to this embodiment, the water-soluble resin sheet arrangement step S10 and the integration step S20 are not limited to being performed in the fixing apparatus 12, and may be performed in a different fixing apparatus. FIG. 4 is a cross-sectional view schematically depicting a water-soluble resin sheet arrangement step S10 and integration step S20 according to a modification. In FIG. 4, a fixing machine 22 in this modification is schematically depicted.

A description will be made about the fixing machine 22. The fixing machine 22 includes a plate-shaped object support portion 24 that supports the plate-shaped object 1. The plate-shaped object support portion 24 has an upper surface, which serves as a planar support surface 24*a* to support the plate-shaped object 1 thereon. Disposed inside the plate-shaped object support portion 24 is a heating member 26 that can heat the water-soluble resin sheet 13 via the plate-shaped object 1 placed on the support surface 24*a*. The heating member 26 is configured, for example, by an electric heating wire or the like. The fixing machine 22 also includes a press roller 28 that presses, from above, the water-soluble resin sheet 13 arranged on the front surface 1*a* of the plate-shaped object 1. The press roller 28 can move in a direction parallel to the support surface 24*a* while pressing the water-soluble resin sheet 13 from above.

In the water-soluble resin sheet arrangement step S10 according to the modification, the plate-shaped object 1 is placed on the support surface 24*a* of the plate-shaped support portion 24. At this time, the orientation of the plate-shaped object 1 is determined such that the front surface 1*a*, on which the water-soluble resin sheet 13 is to be placed, is directed upward and the back surface 1*b* is directed downward. After that, the water-soluble resin sheet 13 having thermoplasticity is arranged on the side of the front surface 1*a* of the plate-shaped object 1 as depicted in FIG. 4. The integration step S20 according to the modification is then performed. The heating member 26 is first operated to heat the water-soluble resin sheet 13 via the plate-shaped object 1, whereby the water-soluble resin sheet 13 is melted or softened. The press roller 28 is then rolled from one end to the other end of the plate-shaped object 1 while pressing the water-soluble resin sheet 13 toward the plate-shaped object 1. As a consequence, the water-soluble resin sheet 13 is thermocompression-bonded to the plate-shaped object 1. In other words, the water-soluble resin sheet 13 and the plate-shaped object 1 are integrated together. Subsequently, the operation of the heating member 26 is stopped, the water-soluble resin sheet 13 is allowed to return to room temperature, and the water-soluble resin sheet 13 is cut along the outer periphery of the plate-shaped object 1, whereby the water-soluble protective film is arranged on the front surface 1*a* of the plate-shaped object 1.

When the water-soluble resin sheet arrangement step S10 and integration step S20 are performed, the water-soluble protective film is formed on the front surface 1*a* of the plate-shaped object 1. This water-soluble protective film is formed by the arrangement of the water-soluble resin sheet 13 on the front surface 1*a* of the plate-shaped object 1 and its integration with the plate-shaped object 1. Different from a case that performs a method such as spin coating, the water-soluble protective film is formed with a uniform thickness on the front surface 1*a* of the plate-shaped object 1.

Figure 5:
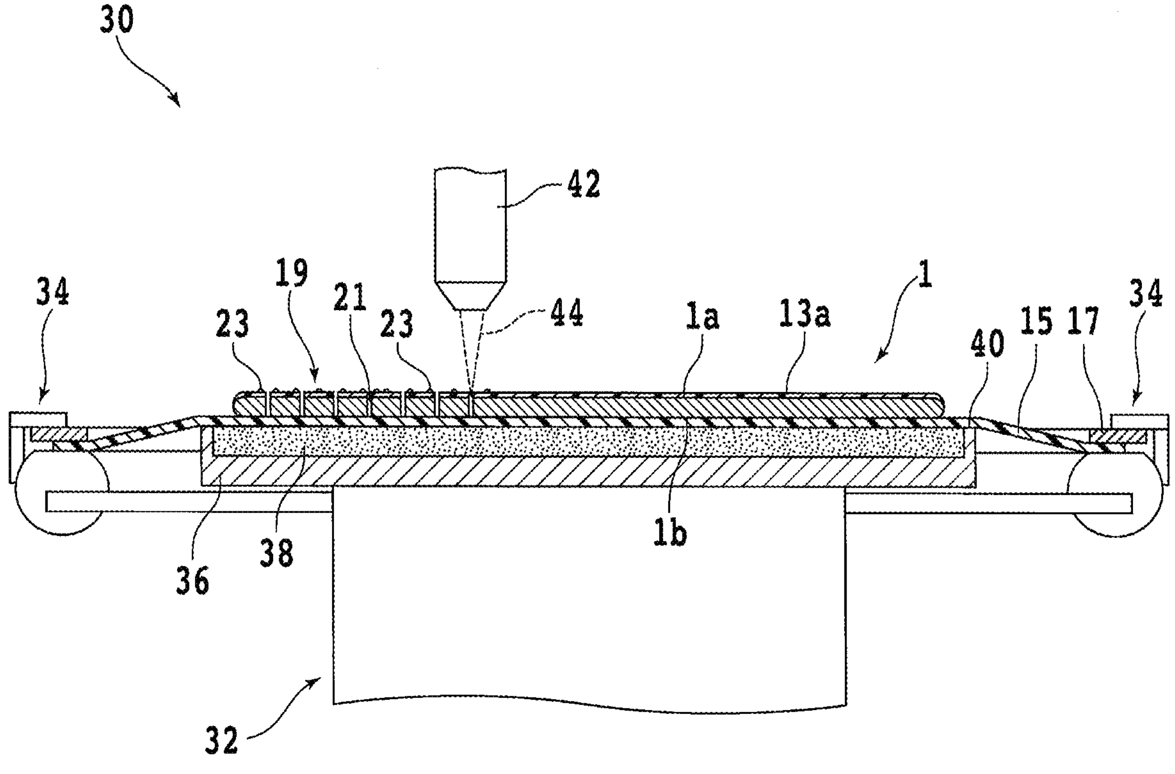
FIG. 5 is a cross-sectional view schematically depicting a laser processing machine in a processing step of the processing method according to the embodiment.

In the processing method according to this embodiment, a processing step S30 is performed to process the plate-shaped object 1 after the integration step S20 is performed. In the processing step S30, processing is appropriately performed using the water-soluble protective film formed with the uniform thickness on the front surface 1*a* of the plate-shaped object 1. FIG. 5 is a cross-sectional view schematically depicting the processing step S30 according to this embodiment. In the processing step S30, the plate-shaped object 1 is processed by irradiating it with, for example, a laser beam 44 of a wavelength having absorptivity for the plate-shaped object 1, so that dividing grooves are formed along the scribe lines 3 in the plate-shaped object 1. In other words, the plate-shaped object 1 is subjected to ablation processing with the laser beam 44. As depicted in FIG. 5, before processing, a tape 15 called a "dicing tape" may be bonded to the side of the back surface 1*b* of the plate-shaped object 1, and an annular frame 17 made from a metal material or the like may be bonded to an outer peripheral portion of the tape 15. In other words, the plate-shaped object 1 integrated with the tape 15 and the frame 17 may be subjected to processing in the processing step S30. Handling of the plate-shaped object 1 supported on the tape 15 is easy. Handling of chips formed by division of the plate-shaped object 1 is also facilitated because the chips are kept supported on the tape 15.

In FIG. 5, a laser processing machine 30 that applies ablation processing to the plate-shaped object 1 is schematically depicted. Here, a description is made about the laser processing machine 30. The laser processing machine 30 includes a holding table (chuck table) 32 that holds the plate-shaped object 1 to be processed, and a laser processing unit 42 that applies the laser beam 44 to the plate-shaped object 1 held on the holding table 32.

The holding table (chuck table) 32 is connected to a rotary drive source (not depicted) such as a motor, and is rotatable about an axis of rotation that is perpendicular to an upper surface of the holding table 32. The upper surface of the holding table 32 serves as a holding surface 40 that sucks and holds the plate-shaped object 1. Around the holding surface 40, clamps 34 are arranged to fix the annular frame 17 that holds the plate-shaped object 1 via the tape 15. The holding table 32 includes a porous member 38 of a diameter equal to that of the plate-shaped object 1, and a frame body 36 with the porous member 38 accommodated therein such that the porous member 38 is exposed upward. Inside the holding table 32, a suction path (not depicted) is formed. The suction path is connected at one end thereof to a suction source such as a motor and at the other end thereof to the porous member 38. When the plate-shaped object 1 is arranged on the porous member 38, and is sucked by the suction source through the porous member 38 and the suction path, the plate-shaped object 1 is held by suction on the holding table 32. The porous member 38 therefore serves, at an upper surface thereof, as the holding surface 40.

The laser processing unit 42 has a function to focus the laser beam 44, which is of the wavelength having absorptivity for the plate-shaped object 1, at a predetermine height in the plate-shaped object 1. When the holding table 32 is moved in a direction parallel to the holding surface 40 while the plate-shaped object 1 is being irradiated with the laser beam 44, the plate-shaped object 1 can be scanned at various points with the laser beam 44.

When the processing step S30 is performed in the laser processing machine 30, the plate-shaped object 1 with a water-soluble protective film 13*a* formed thereon is first placed on the holding surface 40 of the holding table 32. The frame 17 is then grasped by the clamps 34 and, at the same time, the plate-shaped object 1 is held by suction on the holding table 32 via the tape 15. The holding table 32 is next moved such that the focal point of the laser beam 44 from the laser processing unit 42 is arranged at an end portion of one of the scribe lines 3. After that, the plate-shaped object 1 is moved along the one scribe line 3 while the laser beam 44 is being applied from the laser processing unit 42 to the plate-shaped object 1, whereby ablation processing of the plate-shaped object 1 is performed. When the ablation processing is performed on the plate-shaped object 1, a dividing groove 21 is formed in the plate-shaped object 1. Examples of irradiation conditions for the laser beam 44 will be described below.

Laser medium: Nd:YAG
Wavelength: 355 nm
Average power output: 5.0 W
Repetition frequency: 20 KHz
Focal spot diameter: 5.0 μm
Processing feed rate: 100 mm/s After the plate-shaped object 1 has been irradiated with the laser beam 44 along the one scribe line 3, the plate-shaped object 1 is subjected to index feeding, and the plate-shaped object 1 is then similarly irradiated with the laser beam 44 along another one of the scribe lines 3. After the plate-shaped object 1 has been subjected to laser processing along all the scribe lines 3 extending along one direction, the holding table 32 is rotated, and the plate-shaped object 1 is similarly subjected to laser processing along one of the scribe lines 3 extending along the other direction. When the plate-shaped object 1 has been subjected to laser processing along all the scribe lines 3, the processing of the plate-shaped object 1 is completed.

It is to be noted that, in the processing step S30, the laser beam 44 is applied to the plate-shaped object 1 through the water-soluble protective film 13*a*. At this time, the water-soluble protective film 13*a* is processed by absorption of a portion of the laser beam 44, and the plate-shaped object 1 is melted in parts, so that debris is given off. Debris 23 is then scattered around focal points of the laser beam 44. As the front surface 1*a* of the plate-shaped object 1 is covered by the water-soluble protective film 13*a* in the processing method according to this embodiment, the debris 23 does not directly come into contact with the front surface 1*a* of the plate-shaped object 1, but is stuck on the water-soluble protective film 13*a*. The front surface 1*a* of the plate-shaped object 1 is therefore protected by the water-soluble protective film 13*a*.

Now, if the water-soluble protective film 13*a* is thick, or if the intensity of the laser beam 44 is insufficient, the water-soluble protective film 13*a*, despite the irradiation of the plate-shaped object 1 with the laser beam 44, may not be sufficiently pierced, and hence the debris 23 may not be appropriately discharged. If a light absorber is contained in the water-soluble resin sheet 13 as the raw material for the water-soluble protective film 13*a*, however, the water-soluble protective film 13*a* more appropriately absorbs the laser beam 44, so that the processing of the water-soluble protective film 13a is promoted to facilitate rupture of the water-soluble protective film 13a. Accordingly, the debris 23 is appropriately discharged.

After the formation of the dividing grooves 21 in the plate-shaped object 1 along the individual scribe lines 3, the plate-shaped object 1 is divided into individual chips 19. The chips 19 so formed are kept supported on the tape 15. After the processing of the plate-shaped object 1 has been completed using the water-soluble protective film 13a as described above, the plate-shaped object 1 (chips 19), in a state where it is supported on the tape 15, is unloaded from the laser processing machine 30. The processing step S30 is now completed.

Figure 6:
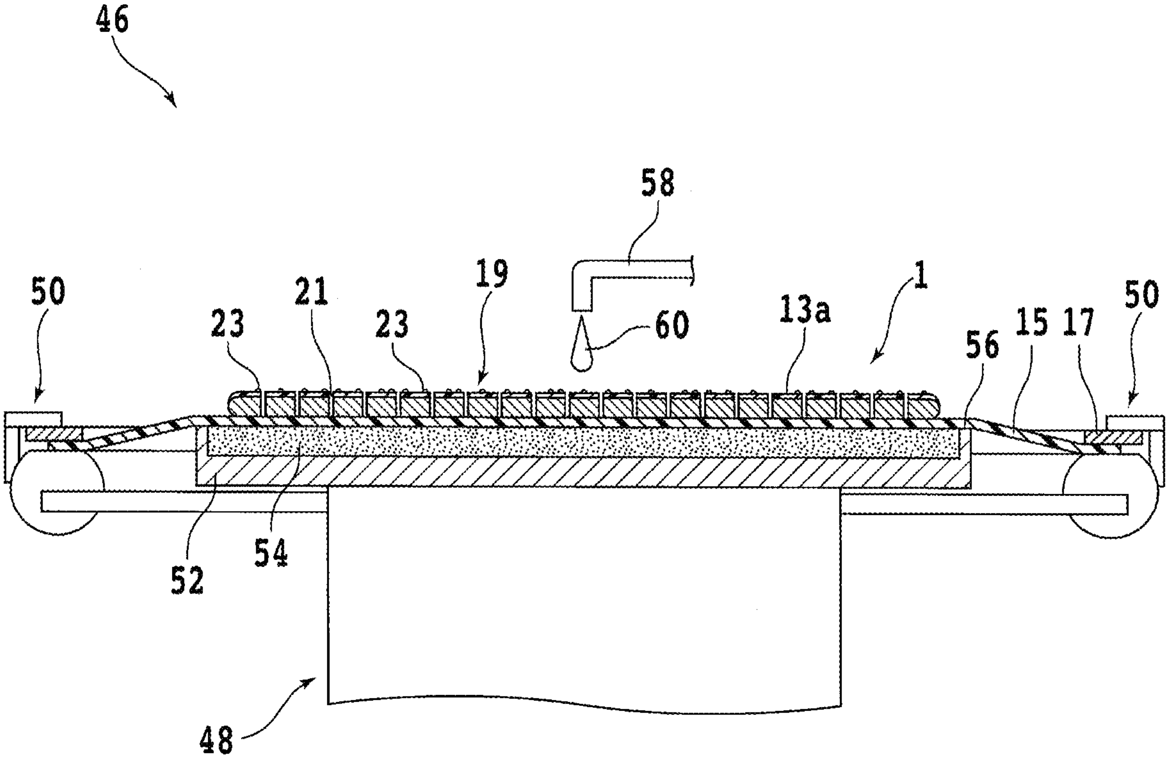
FIG. 6 is a cross-sectional view schematically depicting a rinsing machine in a water-soluble protective film removal step of the processing method according to the embodiment.

In the processing method according to this embodiment, a water-soluble protective film removal step S40 is performed after the processing step S30 has been performed. In the water-soluble protective film removal step S40, a rinse solution is supplied to the plate-shaped object 1 to remove the water-soluble protective film 13a from on the plate-shaped object 1. FIG. 6 is a cross-sectional view schematically depicting the water-soluble protective film removal step S40. The water-soluble protective film removal step S40 is performed, for example, in a rinsing machine 46 depicted in FIG. 6. The rinsing machine 46 includes a spinner table 48 and a rinse nozzle 58 that supplies a rinse solution 60 to the plate-shaped object 1 held on the spinner table 48.

The spinner table 48 is connected to a rotary drive source (not depicted) such as a motor, and is rotatable about an axis of rotation that is perpendicular to an upper surface of the spinner table 48. The upper surface of the spinner table 48 serves as a holding surface 56 that sucks and holds the plate-shaped object 1. Around the holding surface 56, clamps 50 are arranged to fix the annular frame 17. The spinner table 48 includes a porous member 54 of a diameter equal to that of the plate-shaped object 1, and a frame body 52 with the porous member 54 accommodated therein such that the porous member 54 is exposed upward. Inside the spinner table 48, a suction path (not depicted) is formed. The suction path is connected at one end thereof to a suction source such as a motor and at the other end thereof to the porous member 54. When the plate-shaped object 1 is arranged on the porous member 54 and is sucked by the suction source through the porous member 54 and the suction path, the plate-shaped object 1 is held by suction on the spinner table 48. The porous member 54 therefore serves, at an upper surface thereof, as the holding surface 56.

The rinse nozzle 58 may be allowed to move in a plane parallel to the holding surface 56 along a track that passes above a center of the holding surface 56. The rinse nozzle 58 ejects the rinse solution 60, which contains pure water as a principal component, or the rinse solution 60, which is composed of a mixed fluid of pure water and a high-pressure gas, toward the front surface 1a of the plate-shaped object 1 held on the spinner table 48. A surfactant may be mixed in the rinse solution 60.

In the water-soluble protective film removal step S40, the processed plate-shaped object 1 is first loaded into the rinsing machine 46 to be held on the spinner table 48. The frame 17 is then fixed by the clamps 50. After that, rotation of the spinner table 48 is started, and supply of the rinse solution 60 from the rinse nozzle 58 to the front surface 1a of the plate-shaped object 1 is started. When the rinse solution 60 is supplied to the front surface 1a of the plate-shaped object 1 (chips 19), the water-soluble protective film 13a is dissolved into the rinse solution 60, and the water-soluble protective film 13a is removed. At this time, the debris 23 stuck on the water-soluble protective film 13a is washed away with the rinse solution 60. The debris 23 is therefore easily removed from the plate-shaped object 1 (chips 19). After completion of the removal of the water-soluble protective film 13a from the plate-shaped object 1, the supply of the rinse solution 60 from the rinse nozzle 58 to the plate-shaped object 1 is stopped. The rotation of the spinner table 48 is continued as it is, so that the plate-shaped object 1 (chips 19) is dried. Then, the rotation of the spinner table 48 is stopped, and the plate-shaped object 1 (chips 19) is unloaded from the spinner table 48, whereby the chips 19 are obtained without the water-soluble protective film 13a. As a consequence, the water-soluble protective film removal step S40 is completed.

According to the processing method of the plate-shaped object (the forming method of the water-soluble protective film) of this embodiment, the thickness of the water-soluble protective film 13a does not change depending on the location as described above despite the plate-shaped object 1 has the projections and recesses in the front surface 1a. Therefore, the projections on the front surface 1a of the plate-shaped object 1 can be fully protected and, in addition, the water-soluble protective film 13a does not become excessively thick even at the recesses. Accordingly, the raw material for the water-soluble protective film 13a is not used more than is necessary, and the processing on the plate-shaped object 1 is not needed to be performed at an intensity beyond necessary.

It is to be noted that the present invention is not limited to the description of the above-described embodiment and can be practiced with various modifications. In the embodiment described above, the description is made, for example, about the case in which, in the processing step S30, the laser processing machine 30 (FIG. 5) is used and the plate-shaped object 1 is subjected to ablation processing, but the processing method according to the second aspect of the present invention is not limited to such a case. In other words, the processing that is performed using the water-soluble protective film 13a in the processing step S30 is not limited to the ablation processing by the laser beam 44. In addition, the application of the water-soluble protective film 13a is not limited to the protection of the front surface 1a of the plate-shaped object 1 from the debris 23.

Figure 7:
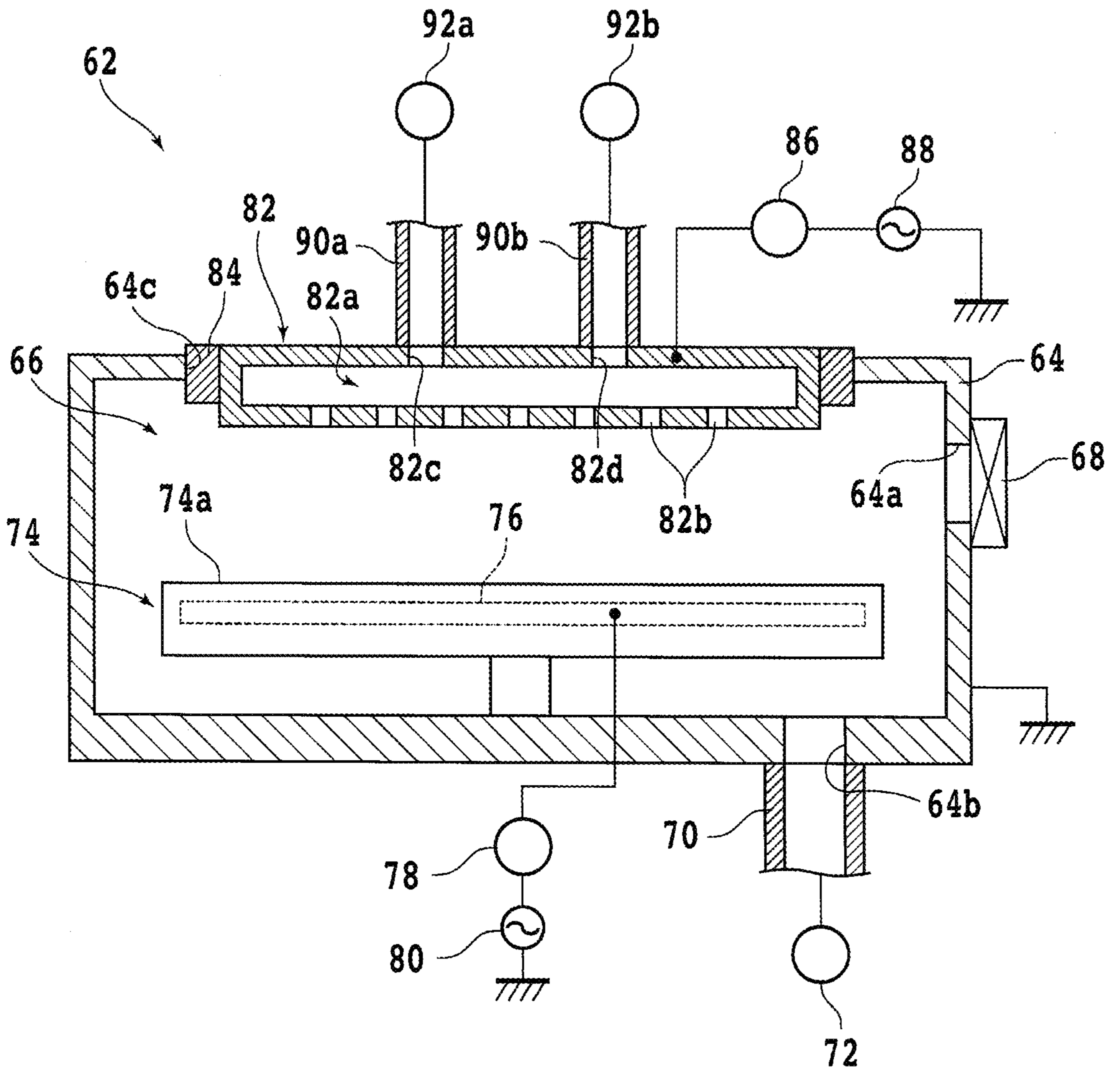
FIG. 7 is a cross-sectional view schematically depicting a plasma processing system for use in performing a processing step according to a modification of the processing method according to the embodiment.

For example, the water-soluble protective film 13a may also be used as a mask (resist) for performing etching of the plate-shaped object 1, and in the processing step S30, etching treatment may be performed on the plate-shaped object 1. In other words, in the processing step S30, the water-soluble protective film 13a may be removed in parts to have the plate-shaped object 1 exposed in parts through the water-soluble protective film 13a, and portions of the plate-shaped object 1 exposed through the water-soluble protective film 13a may be processed. FIG. 7 is a cross-sectional view schematically depicting a plasma processing system 62 in which the processing step S30 according to the modification is performed.

A description will be made about the plasma processing system 62. The plasma processing system 62 includes a chamber housing 64, in which the plate-shaped object 1 is to be placed. The chamber housing 64 is made from an electrically conductive material such as a metal, and is grounded. An inside of the chamber housing 64 corresponds to a processing space 66, in which plasma processing for the plate-shaped object 1 is to be performed. In a side wall of the chamber housing 64, an opening 64a is disposed to transfer the plate-shaped object 1. On an outer side of the opening 64a, a gate (openable door) 68 is disposed to open or close the opening 64*a*. A moving mechanism (not depicted) such as an air cylinder is connected to the gate 68, and the gate 68 is raised or lowered by the moving mechanism along a side wall of the chamber housing 64. By lowering the gate 68 and exposing the opening 64*a*, the plate-shaped object 1 can be loaded into the processing space 66 through the opening 64*a*, or can be unloaded from the processing space 66 through the opening 64*a*. Further, the processing space 66 is hermetically closed by raising the gate 68 and closing the opening 64*a*.

In a bottom wall of the chamber housing 64, an opening 64*b* is disposed to communicate the inside and outside of the chamber housing 4 with each other. The opening 64*b* is communicated to an exhaust device 72 such as a vacuum pump via a piping 70. When the exhaust device 72 is operated with the processing space 66 kept hermetically closed, the processing space 66 is exhausted and depressurized.

In the processing space 66, a holding table (chuck table) 74 is disposed to hold the plate-shaped object 1. The holding table 74 has an upper surface, which is a planar surface substantially parallel to a horizontal plane, and constitutes a holding surface 74*a* on which the plate-shaped object 1 is to be held. An electrostatic chuck that holds the plate-shaped object 1 by an electric force can also be used as the holding table 74. The holding table 74 is made, for example, from a dielectric material such as a ceramic, and a disk-shaped electrode 76 is disposed inside the holding table 74. The electrode 76 is arranged substantially in parallel to the holding surface 74*a*, and is connected to a radio frequency power supply 80 via a matcher 78. It is to be noted that a cooling path (not depicted) may also be disposed inside the holding table 74 to allow flowing of a coolant such as water. The holding table 74 is cooled by allowing the coolant to flow through the cooling path and to circulate inside the holding table 74.

Above the holding table 74, a gas ejection head 82 is disposed. The gas ejection head 82 is made from an electrically conductive material such as a metal, and is inserted in an opening 64*c* disposed through a top wall of the chamber housing 64. It is to be noted that an annular bearing 84 made from an electrically insulating material is disposed between the top wall of the chamber housing 64 and the gas ejection head 82. The bearing 84 is disposed so as to surround the gas ejection head 82, and insulates the top wall of the chamber housing 64 and the gas ejection head 82.

The gas ejection head 82 is connected to a radio frequency power supply 88 via a matcher 86. To the gas ejection head 82, a lift mechanism (not depicted) is connected to raise or lower the gas ejection head 82 in a vertical direction. The distance between the holding table 74 and the gas ejection head 82 is adjusted by raising or lowering the gas ejection head 82 with the lift mechanism. Disposed inside the gas ejection head 82 is a gas diffusion space 82*a* to which two gases of different types for plasma processing are supplied. On a side of a lower surface of the gas ejection head 82, a plurality of gas supply paths 82*b* are disposed, communicating the processing space 66 of the chamber housing 64 and the gas diffusion space 82*a* to each other. On a side of an upper surface of the gas ejection head 82, a pair of gas supply paths 82*c* and 82*d* is disposed. The gas supply path 82*c* is connected to a gas supply source 92*a* via a piping 90*a*, while the gas supply path 82*d* is connected to a gas supply source 92*b* via a piping 90*b*.

The gas supply source 92*a* supplies one of the two gases of different types for plasma processing to the gas diffusion space 82*a* via the piping 90*a* and the gas supply path 82*c*. Similarly, the gas supply source 92*b* supplies the other one of the two gases of different types for plasma processing to the gas diffusion space 82*a* via the piping 90*b* and the gas supply path 82*d*. As a consequence, these two gases of different types are mixed in the gas diffusion space 82*a*. It is to be noted that FIG. 7 depicts a configuration in which the two gases of different types for plasma processing are supplied to the gas ejection head 82 from the two gas supply sources 92*a* and 92*b*, respectively. However, the number of gas supply sources connected to the gas ejection head 82 may be one, or three or more.

When plasma processing (plasma etching) is applied to the plate-shaped object 1 using the plasma processing system 62, the water-soluble protective film 13*a* is processed beforehand to pattern it into a predetermined configuration. For example, the water-soluble protective film 13*a* is beforehand removed in parts by irradiating the water-soluble protective film 13*a* with a laser beam along the scribe lines 3 on the plate-shaped object 1. This exposes the front surface 1*a* of the plate-shaped object 1 along the scribe lines 3.

When the processing step S30 is performed in the plasma processing system 62, the gate 68 is first lowered, and then the opening 64*a* is exposed. The plate-shaped object 1 is then loaded by a transfer mechanism (not depicted) into the processing space 66 through the opening 64*a*, and is arranged on the holding surface 74*a* of the holding table 74. It is to be noted that, upon loading of the plate-shaped object 1, the gas ejection head 82 may preferably be raised beforehand to widen the distance between the holding table 74 and the gas ejection head 82. The gate 68 is next raised to close the opening 64*a*, whereby the processing space 66 is hermetically closed. A predetermined voltage is then applied to the electrode 76 by the radio frequency power supply 80. This causes dielectric polarization to occur on a side of the holding surface 74*a* of the holding table 74, and an electrostatic attraction force acts between the holding surface 74*a* and the plate-shaped object 1. As a result, the plate-shaped object 1 is held by attraction on the holding surface 74*a*. Further, the height of the gas ejection head 82 is adjusted such that the holding table 74 and the gas ejection head 82 are arranged at a distance suited for plasma processing. Furthermore, when the exhaust device 72 is operated, the processing space 66 is exhausted and depressurized.

Both, one, or the other of the two gases of different types for plasma processing are/is next supplied from the gas supply source 92*a* and/or the gas supply source 92*b* to the gas diffusion space 82*a*. Further, radio frequency power is applied by the radio frequency power supply 88 to the gas ejection head 82. As a result, a gas mixture in the gas diffusion space 82*a* is transformed into a plasma, and the resulting plasmatic gas is supplied to and spread in the processing space 66 through the gas supply paths 82*b*. As a consequence, the plasmatic gas is supplied to the plate-shaped object 1 on the holding table 74, so that predetermined plasma processing is applied to the plate-shaped object 1. In this case, the front surface 1*a* of the plate-shaped object 1 is protected in parts by the water-soluble protective film 13*a*, the plasmatic gas acts along the scribe lines 3 on the exposed parts of the front surface 1*a* of the plate-shaped object 1, and the plate-shaped object 1 is etched at the exposed parts. In other words, plasma etching is performed on the plate-shaped object 1 while the water-soluble protective film 13*a* is functioning as a mask (resist). After the dividing grooves 21 have been formed along the scribe lines 3 in the plate-shaped object 1 by the plasma etching, the plate-shaped object 1 is divided into the individual chips 19. The processing step S30 is now completed.

After the completion of the processing step S30, the water-soluble protective film removal step S40 is desirably performed. Described specifically, the plate-shaped object 1 (chips 19) is unloaded from the plasma processing system 62, is loaded into the rinsing machine 46 depicted in FIG. 6, and is rinsed with the rinse solution 60. In this case, the water-soluble protective film 13*a* is removed, with the rinse solution 60, from the plate-shaped object 1 (chips 19).

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A forming method of a water-soluble protective film on a front surface of a plate-shaped object, the forming method comprising:

a water-soluble sheet arrangement step of arranging a water-soluble resin sheet having thermoplasticity on a side of the front surface of the plate-shaped object; and an integration step including:

moving the plate-shaped object with the water-soluble resin sheet on the front surface into a space of a fixed apparatus, and creating a differential pressure within the space to cause the water-soluble resin sheet to closely contact the front surface of the plate-shaped object; and heating the water-soluble resin sheet to melt or soften the same, and integrating the water-soluble resin sheet and the plate-shaped object, to form the water-soluble protective film on the plate-shaped object.

2. The forming method according to claim 1, wherein the water-soluble resin sheet contains a light absorber.

3. A processing method of a plate-shaped object, comprising:

a water-soluble sheet arrangement step of arranging a water-soluble resin sheet having thermoplasticity on a side of a front surface of the plate-shaped object;

an integration step including:

moving the plate-shaped object with the water-soluble resin sheet on the front surface into a space of a fixed apparatus, and creating a differential pressure within the space to cause the water-soluble resin sheet to closely contact the front surface of the plate-shaped object; and heating the water-soluble resin sheet to melt or soften the same, and integrating the water-soluble resin sheet and the plate-shaped object, to form a water-soluble protective film on the plate-shaped object;

a processing step of, after performing the integration step, processing the plate-shaped object; and a water-soluble protective film removal step of, after performing the processing step, supplying a rinse solution to the plate-shaped object, and removing the water-soluble protective film from the plate-shaped object.

4. The processing method according to claim 3, wherein, in the processing step, the plate-shaped object is irradiated via the water-soluble protective film with a laser beam of a wavelength having absorptivity for the plate-shaped object, to process the plate-shaped object.

5. The processing method according to claim 3, wherein, in the processing step, the water-soluble protective film is removed in parts to have the plate-shaped object exposed through removed portions of the water-soluble protective film, and portions of the plate-shaped object exposed through the water-soluble film are processed.

6. The processing method according to claim 3, wherein the water-soluble resin sheet contains a light absorber.

7. The processing method according to claim 4, wherein the water-soluble resin sheet contains a light absorber.

8. The processing method according to claim 5, wherein the water-soluble resin sheet contains a light absorber.

9. The forming method according to claim 1, wherein heating the water-soluble resin sheet includes pressing the water-soluble resin sheet on the front surface of the plate-shaped object while the water soluble resin sheet is being heated.

10. The processing method according to claim 3, wherein heating the water-soluble resin sheet includes pressing the water-soluble resin sheet on the front surface of the plate-shaped object while the water soluble resin sheet is being heated.

* * * * *